United States Patent [19]

Farona et al.

[11] Patent Number: 4,599,384

[45] Date of Patent: Jul. 8, 1986

[54] NOVEL EPDM-ISOBUTYLENE GRAFT COPOLYMERS

[75] Inventors: Michael F. Farona, Cuyahoga Falls; Joseph P. Kennedy, Akron, both of Ohio

[73] Assignee: The University of Akron, Akron, Ohio

[21] Appl. No.: 633,300

[22] Filed: Jul. 23, 1984

[51] Int. Cl.$^4$ ............................................. C08F 255/10
[52] U.S. Cl. ................................... 525/245; 525/249; 525/289; 525/290
[58] Field of Search ................ 525/290, 289, 245, 249

[56] References Cited

U.S. PATENT DOCUMENTS

| | | | |
|---|---|---|---|
| 3,703,566 | 11/1972 | Duck et al. .......................... | 525/289 |
| 3,819,765 | 6/1974 | O'Shea ................................ | 525/290 |
| 3,862,097 | 1/1975 | Milkovich et al. ................. | 525/263 |
| 3,886,233 | 5/1975 | Visseren .............................. | 525/290 |

FOREIGN PATENT DOCUMENTS 48-29877 9/1973 Japan .................................. 525/290

Primary Examiner—Wilbert J. Briggs, Sr.
Attorney, Agent, or Firm—Oldham, Oldham & Weber Co.

[57] ABSTRACT

Macromonomers of polymer-dicyclopentadiene and polymer-ethylidenenorbornene are prepared and then terpolymerized with ethylene and propylene. The terpolymer exhibits compatibilization of ethylene-propylene rubber and butyl rubber, and thus is useful as a sealant, roofing material, caulking agent, and the like.

15 Claims, No Drawings

NOVEL EPDM-ISOBUTYLENE GRAFT COPOLYMERS

TECHNICAL FIELD

Macromonomers of polyisobutylene-dicyclopentadiene (PIB-DCp) and polyisobutylene-ethylidenenorbornene (PIB-ENB) are produced. Graft terpolymers are made by terpolymerizing these macromonomers with ethylene-propylene monomers.

BACKGROUND ART

Heretofore, ethylene-propylene-diene monomer (EPDM) terpolymers have been synthesized, using dicyclopentadiene, ethylidenenorborene, and 1,4-hexadiene as the dienes. However, similar dienes containing an attached polymer have not been incorporated into EPDM terpolymers.

The thesis of Dr. Carlson, while relating to the synthesis, characterization and Diels-Alder chain linking of cyclopentadiene telechelic polisobutylene, fails to teach or suggest the terpolymers of the present invention.

DISCLOSURE OF INVENTION

It is therefore an aspect of the present invention to produce an EPDM graft terpolymer using macromonomers of a polymer-dicyclopentadiene and a polymer-ethylidenenorbornene.

It is a further aspect of the present invention to produce EPDM terpolymers, as above, wherein Ziegler-Natta type catalysts are utilized.

It is a yet further aspect of the present invention to produce EPDM graft terpolymers, as above wherein for example said polymer is polyisobutylene, polystyrene, or the like.

It is still another aspect of the present invention to produce graft EPDM graft terpolymers, as above, which are vulcanizable.

These and other aspects of the present invention will become apparent from the following specification which describes in detail the invention.

In general, an EPDM graft terpolymer comprises: the terpolymer having ethylene and propylene units randomly distributed in the backbone thereof, the total number of said ethylene and propylene units being from about 100 to about 10,000, with the amount of ethylene units ranging from about 10 percent to about 90 percent based on the total number of ethylene and propylene units, from about 1 to 100

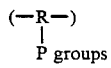

P groups where R is a terpolymerizable head group selected from the group of dicyclopentadiene and ethylidenenorbornene, said R is attached to a polymer P selected from the group consisting of polyisobutylene and polystyrene, wherein said graft copolymer has a molecular weight of from about 5,000 to about 1,000,000.

Generally, a process for making a graft terpolymer comprises the steps of: reacting monomers of ethylene and propylene with a macromonomer in the presence of a Ziegler-Natta catalyst combination, said ethylene and propylene monomers forming the backbone of the terpolymer.

BEST MODE FOR CARRYING OUT THE INVENTION

The graft copolymers of the present invention are prepared by reacting monomers of ethylene and propylene with various macromonomers. Examples of specific macromonomers include polyisobutenyldicyclopentadiene (PIB-DCp), polystyrenedicyclopentadiene (PSt-DCp), polyisobutenylethylidenenorbornene (PIB-ENB) and polystyreneethylidenenorbornene (PSt-ENB), and the like. The polymer, for example polyisobutylene, polystyrene, and the like can generally be attached to the dicyclopentadiene as follows:

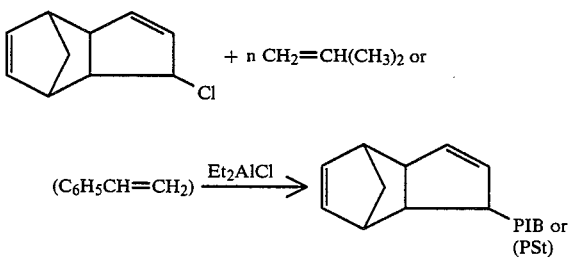

Similarly, with regard to ethylidenenorbornene, the polymer can be attached at either of two positions, as follows:

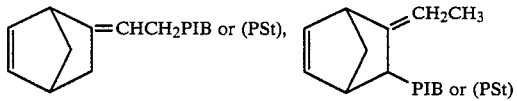

A solution of such a macromonomer will usually contain both of the above isomers.

The macromonomer can be made in any conventional manner as for example in the manner set forth in the Examples herein below.

The macromonomer preparation generally takes place in a reaction vessel, in which air has been purged with an inert gas, such as nitrogen, etc., at ambient pressure. The reaction vessel contains a suitable solvent such as a hydrocarbon, for example an alkane containing from 5 to 10 carbon atoms, for example n-heptane, with n-hexane being preferred, a cycloalkane having from 5 to 8 carbon atoms with 6 to 8 carbon atoms being preferred, an aromatic and an alkyl substituted aromatic having from 6 to 10 carbon atoms with from 6 to 8 carbon atoms being preferred.

Desirably, the vessel is immersed in a suitable bath at ambient temperature to maintain a constant temperature. That is, the reaction temperature of the present invention generally occurs at ambient temperatures, from about 0° C. to about 50° C., and more preferably from about 15° C. to about 25° C. Generally, the gaseous ethylene and propylene monomers are introduced into the vessel. Simultaneously therewith the macromonomer can be added. Additionally, the catalyst is added simultaneously with the addition of the various monomers.

The catalysts of the present invention include any of the Ziegler-Natta catalyst combinations. Specific example include $VOCl_3/(C_2H_5)_3Al_2Cl_3$, $VOCl_3/ElAlCl_2$. /$VOCl_3/R_xAlCl_{3-x}$, and the like. Generally, $VOCl_3/(C_2H_5)_3Al_2Cl_3$ is preferred. In fact, the catalyst components are generally added together in a mole ratio of approximately 3 to 5 mole of aluminum for each mole of vanadium and desirably in a mole ratio of from about 3.5 to about 4 to 1 with a mole ratio of from about 4 to 1 being preferred. The components are generally added until the addition of macromonomer is complete. Usually, once the macromonomer addition has been terminated, the addition of the catalyst and monomers, such as ethylene and propylene, also are terminated. The amount of ethylene and propylene monomers to the macromonomer generally ranges from about 100 to about 400 moles of each per mole of macromonomer, desirably from about 150 to about 250 moles of each per mole of macromonomer, and preferably from about 200 to 220 each per mole of macromonomer. The total number of ethylene and propylene units in the graft copolymer backbone is from about 100 to about 10,000 with from about 100 to about 3,000 being preferred. Based upon the total number of ethylene and propylene units, the number of ethylene units ranges from about 10 to about 90 percent, with a preferred range being from about 50 to 60 percent. The ethylene and propylene units are generally randomly distributed throughout the backbone which also contains a compound having the formula:

where R is a terpolymerizable head group selected from the group of dicyclopentadiene and ethylidenenorbornene, with P being said polyisobutylene or said polystyrene. The amount of catalyst added per mole of macromonomer generally is from about 0.03 to about 3 mole per mole of macromonomer and preferably from about 0.1 to about 0.6 moles per mole of macromonomer. Generally, the monomers, catalyst components and macromonomers, are added in the above proportions over a period of time until dropwise addition of macromonomer is complete (about 20 minutes). Once the addition of components has been stopped, the solution is stirred for a few more minutes and then it is poured into a liquid which precipitates the graft terpolymer. Examples of precipitating agents include methanol containing an antioxidant stabilizer such as N-phenyl-betanaphthylamine, hydroquinone and the like. The terpolymers are generally collected by filtration and redissolved in heptane. The heptane is then evaporated to recover the terpolymer.

Depending upon the molecular weight of the macromonomer, along with the reactivity of various macromonomers, an EPDM graft copolymer can generally be tailor-made with regard to any specific molecular weight and number of graft branches dependent therefrom. The diene portion of the polymer is derived from either the dicyclopentadiene or the ethylidenenorbornene portion of the above-noted macromonomers. Generally, the number average molecular weight of the graft copolymer wherein the diene is DCp is from about 5,000 to about 1,000,000 and preferably from about 10,000 to about 100,000. The number average molecular weight of the graft copolymer when the diene is ENB is from about 50,000 to about 1,000,000, desirably from about 75,000 to about 150,000 and preferably from about 100,000 to about 140,000.

In addition to the above components, the graft copolymers of the present invention can contain various colorants, dyes, antioxidants, stabilizers and the like in conventional amounts to impart desirable attributes thereto.

Moreover, the graft copolymers of the present invention are vulcanizable utilizing conventional amounts of rubber curing chemicals such as sulfur, zinc oxide, and the like.

The graft copolymers of the present invention are useful for compatibilization of ethylenepropylene rubbers and butyl rubbers and find utility as materials useful in roofing compounds, rubber blends, as sealants, as caulking agents, as cements and the like.

The invention will be better understood by reference to the following examples.

A graft copolymer of ethylenepropylenepolyisobutenyldicyclopentadiene terpolymer was prepared in the following manner including preparation of the macromonomer.

EXAMPLE 1

Solvents and starting materials n-Heptane was used to dissolve the catalyst components and the macromonomer, as well as the solvent for the polymerization reaction. It was distilled over $LiAlH_4$, and collected and stored under nitrogen over molecular sieves.

The catalyst system was $VOCl_3$ (Aldrich) and $(C_2H_5)_3Al_2Cl_3$(Texas Alkyls). n-Heptane solutions of these compounds were made up as follows: $VOCl_3=0.03M$; $(C_2H_5)_3Al_2Cl_3=0.12M$.

Physical methods

Infrared (ir) spectra were recorded on a Perkin-Elmer Model 521 Spectrophotometer. $^1H$ nuclear magnetic resonance (nmr) spectroscopy were obtained with a Varian EM360 spectrometer using $CS_2$ solutions and TMS as the internal standard. Ultraviolet spectra were taken on an American Instrument Co. DW2A spectrophotometer. Molecular weights were measured by vapor pressure osmometry (Knauer VPO, toluene at 40° C.), membrane osmometry (Mechrolab 503 high speed osmometer, toluene solutions at 37° C.), and gel permeation chromatography (Waters Associates 6000 A pump, UV and RI detectors, microStyragel columns $10^6$, $10^5$, $10^4$, $10^3$, 500 A; elution counts were calibrated by polyisobutylene standards, THF solutions.)

Preparation of 1-chlorodicyclopentadiene, DCp-Cl

This compound was synthesized by the chlorination of dicyclopentadiene-1-ol according to Dilling et al. The carbinol was prepared by allylic oxidation of dicyclopentadiene using selenium dioxide according to Woodward and Katz.

Preparation of PIB-DCp

The polymerization was carried out at −50° C. in a dry box. A methyl chloride solution (1) containing 0.2 g ($1.2 \times 10^{-3}$ mole) DCp-Cl and 164 ml (112 g, 2 mole) isobutylene was treated with $1 \times 10^{-2}$ mole $(C_2H_5)_2AlCl$. The resulting polymer was purified by adding the charge to methanol, recovering the precipitated polymer, and reprecipitating from n-heptane-methanol. The last traces of solvent were removed in vacuum at ambient temperature, yielding 85 g of polymer. A sample of PIB-DCp was cracked at 160° C. under vacuum, which removed cyclopentadiene, leaving polyisobutenylcyclopentadiene PIB-Cp. The amount of DCp head group was determined by comparing ultraviolet spectra of the PIB-Cp against a calibration curve of n-propylcyclopentadiene (see below). The Mn of the polymer by GPC, was 27,000.

Preparation of n-propylcyclopentadiene, PCp

This compound was prepared in a manner analogous to that described by Kraihanzel and Lossee for the synthesis of trimethylsilylcyclopentadiene. Into a 500 ml three-necked flask equipped with a nitrogen inlet, addition funnel, and a condenser were placed 235 ml THF and 18.8 g (0.818 mole) sodium. Cyclopentadiene (81 ml, 63.8 g, 0.967 mol) was added dropwise, and the reaction mixture was stirred overnight. Then 95.7 g (0.778 mole) n-propyl bromide was added dropwise over 2 hour at room temperature, during which time the exothermic reaction raised the temperature of the mixture to the reflux point. The product was added to water and extracted with n-hexane. The organic layer was separated and washed several times with water. The n-hexane was removed by an aspirator and the crude product was distilled. The PCp showed a boiling point of 45° C. at 15 mm. The yield was 34 g, 41.6 percent.

Preparation of ethylene-propylene-polyisobutenyldicyclopentadiene terpolymer EPDM-g-PIB The polymerization was carried out in a 500 ml, four-necked flask which was dried in an oven and then flamed out under nitrogen with a Bunsen burner. Into the flask was placed 200 ml dry n-heptane and a magnetic stirrer. Rubber septums were placed on three necks, and to the fourth was attached a pressure-equalized separatory funnel containing 50 ml of a n-heptane solution of PIB-DCp at a concentration of 0.09 g/ml. The flask was immersed in a water bath at ambient temperature. Ethylene and propylene were introduced into the n-heptane through individual septums from their respective trains. Both gases were passed through CuO catalyst at 150° C. to remove any hydrogen, and then through Drierite to remove moisture. The flow rate of each gas was adjusted through flow meters at 1 liter/minute. The n-heptane solvent was saturated with the two gases (15 minutes), whereupon the PIB-DCp solution was added dropwise to the reaction mixture over a period of 7 minutes. Simultaneous with addition of the polymer solution, the catalyst components were added by means of a syringe pump (Sage Instruments Model 351) at a rate of 4:1. At the end of delivery of the macromonomer, the addition of catalyst components, ethylene and propylene was terminated. The solution was allowed to stir for 5 minutes, then poured into 500 ml of methanol containing 5 g of N-phenyl-betanaphthylamine, resulting in the precipitation of the graft terpolymer. The polymer was then collected by filtration and redissolved in n-heptane. The n-heptane was removed by rotary evaporation; the last traces of solvent were removed in vacuum at 50° C. The yield was 7.5 g. The yield depends on the time of addition of the reactants. When the macromonomer was added over a period of 12 minutes, the yield was 14 g. The molecular weight (Mn) of PIB-DCp was 27,000 by GPC. The molecular weight of the graft copolymer was 60,000. IR and NMR spectroscopy showed the molecule of ethyl/propyl and isobutylene units in the product indicating successful graft copolymerization.

EXAMPLE 2

Synthesis of ethylene-propylene-polyisobutenyl-5-ethylidene-2-norbornene terpolymer (EPDM-g-PIB). Preparation of Allylic Chlorinated 5-ethylidene-2-norbornene (ENB-Cl)

This compound was synthesized by the chlorination of 5-ethylidene-2-norbornene (ENB) using N-chlorocyclohexyl benzenesulfonamide

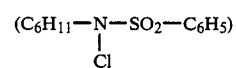

as allylic chlorinating agent. This chlorinating agent was prepared according to the procedure given by W. Theilacker and H. Wessel (1).

ENB was distiled over $CaH_2$ under vacuum to dry and purify it.

70 g (0.255 mol) of crude N-chlorocyclohexyl-benzene-sulfonamide was dissolved in approximately 325 ml of olefin free heptane (dried over sodium) by gentle warming. This solution was placed into a 1 L, three-necked flask, equipped with a long condenser and two gas adaptors. The flask was flushed with nitrogen before and after the addition of above solution. 36 ml (32 g, 0.3 mole) of ENB was then injected into this solution with the help of a syringe. Next 0.67 g (2.8 m mole) of recrystalized benzoylperoxide was added to the reaction mixture. The mixture was refluxed gently for two hours and then heating was stopped and the mixture was allowed to cool down to room temperature. N-cyclohexylbenzenesulfonimide separated out as the reaction mixture cooled down. The reaction mixture was further cooled down by an ice bath to separate out as much N-cyclohexylsulfonamide as possible. This was washed with heptane and filtered through a Buchner funnel. The filtrate was collected and the heptane was removed by a rotary evaporator. The chlorinated product was left behind in the form of light yellow liquid. This crude chlorinated product was purified by vacuum distillation. The structure of ENB-Cl was confirmed by proton NMR and mass spectrum. According to spectroscopy the product is a mixture of two monochlorinated compounds having the following structures.

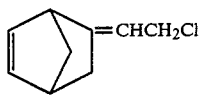

5-chloroethylidene-2 norbornene

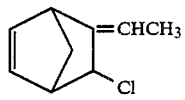

5-ethylidene-6-chloro-2 · norbornene

Synthesis of PIB-ENB

The cationic polymerization was carried out at −40° C. in a dry box equipped with a hexane bath. A three liter, three-necked flask equipped with mechanical stirrer was immersed into the hexane bath and then approximately 1 L of methyl chloride was condensed in it. Next, 100 ml. of isobutylene (1.3 mole) and 258 g (0.0215 mole) of ENB-Cl was added to the flask. The cationic polymerization was initiated by adding 0.015 mole of dimethyl aluminum chloride. The reaction mixture was stirred for 30 minutes and then poured into 500 ml of methanol to terminate the polymerization. The methanol was evaporated by a rotary evaporator and the polymer, in the form of thick yellow oil, was recovered. It was redissolved in heptane and reprecipitated by methanol. The last traces of solvent were removed in vacuum at room temperature. The final yield of polymer was 40 g. The amount of ENB head group was determined by comparing UV spectra of PIB-ENB with a calibration curve of UV absorption of ENB. It was found to be one ENB head group per every PIB chain. The number average molecular weight of PIB-ENB was calculated to be 9,000 by GPC.

Synthesis of EPDM-g-PIB

A 500 ml. four-necked flask was dried in the oven and then flamed out by a Bunsen burner under nitrogen. Into the flask were placed 250 ml. of dry heptane and a magnetic stirrer. Rubber septums were placed on three necks and to the fourth was attached a pressure equalized separatory funnel containing 50 ml of n-heptane solution of PIB-ENB at a concentration of 0.13 per ml. The heptane in the flask was saturated with ethylene and propylene gases (for 15 minutes) coming from individual inlets. Both gases were passed through CuO catalyst at 150° C. to remove any hydrogen, and then through columns packed with Drierite to eliminate any moisture. The flow rate of each gas was adjusted through flow meters at 1 L/min. The PIB-ENB solution was added dropwise over a period of 8 minutes. Simultaneous with the addition of the macromonomer solution, the two catalyst components, ethyl aluminum sesquichloride (0.12 mole) and vanadium oxytrichloride (0.03 mole), were added by means of syringe pump at a rate of 1 ml per minute. At the end of the addition of macromonomer, the addition of catalyst, ethylene and propylene was terminated. The solution was allowed to stir for 5 minutes, then poured into 500 ml of methanol containing 3 g of N-phenyl-beta naphthyl-amine, resulting in precipitation of graft polymer, which was collected by decantation of solvent. The polymer was redissolved in heptane and reprecipitated by methanol. The last traces of solvent were first removed by a rotary evaporator and then in vacuum at 50° C. The yield of the polymer was 10 g.

This polymer showed two peaks in GPC indicating that it was a mixture of two polymers. The separation of these two polymers (high molecular weight and low molecular weight) was accomplished by dissolving the polymer in hexane and slowly precipitating out the high molecular weight polymer by dropwise addition of acetone. This high molecular weight polymer was recovered by filtration. The low molecular weight polymer remained in solution. High molecular weight polymer was redissolved in hexane. Hexane was first removed by rotary evaporator and then the last traces of solvent were removed in vacuum at 50° C. The resulting polymer showed one peak in GPC and was a homogeneous, nontacky elastomer. This polymer was characterized by comparing the UV spectrum of it with that of commercial EPDM, containing ENB, manufactured by Copolymer Rubbers and Chemical Corp. Both polymers showed UV absorption at about the same wavelength. The composition of this polymer was also confirmed by proton NMR spectrometry which showed four peaks. The peaks at delta=1.2 and 0.82 ppm are due to the PDM backbone, whereas those at delta=1.33 and 1.04 ppm are due to PIB branches. The mole weight by GPC was about $10^6$. The calculation from proton NMR spectroscopy revealed that there was 1 double bond per 412 carbon atoms in this EPDM-g-PIB.

Reference

1. W. Theilaker & H. Wessel, Ann; 703,34(1967)

Synthesis of PSt-ENB

The cationic polymerization was carried out at −40° C. in a dry box equipped with a hexane bath. A three liter, 3-necked flask equipped with mechanical stirrer was immersed into hexane bath and then approximately 1 L of methylene chloride was condensed inside it. Next 150 ml of styrene (1.31 mole) and 2.0 g (0.017 mole) of ENB-Cl was added to the flask. The cationic polymerization was initiated by adding 10.0 g diethyl aluminum chloride. The reaction mixture was stirred for 30 minutes and then poured into 500 ml. of methanol to terminate the polymerization. The methanol was evaporated by rotary evaporator and the polymer, in the form of thick yellow oil was recovered. It was redissolved in heptane and reprecipitated by methanol. The last traces of solvent were removed in vacuum at room temperature. The final yield of polymer was 40 g. The amount of ENB head group was determined by comparing UV spectra of PSt-ENB with a calibration curve of UV absorption of ENB. It was found to be one ENB head group per every PSt chain. The number average molecular weight of PSt-ENB was calculated to be 1,100 by GPC.

While in accordance with the patent statutes, the best mode and preferred embodiment has been described in detail, it is to be understood that the scope of the invention is limited by the scope of the attached claims.

What is claimed:

1. An EPDM graft terpolymer, comprising:
the terpolymer having ethylene and propylene units randomly distributed in the backbone thereof, the total number of said ethylene and propylene units being from about 100 to about 10,000, with the amount of ethylene units ranging from about 10 percent to about 90 percent based on the total number of ethylene and propylene units, from about 1 to 100

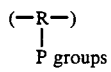

where R is a terpolymerizable head group selected from the group of dicyclopentadiene and ethylidenenorbornene, said R is attached to a polymer P polyisobutylene, wherein said graft copolymer has a molecular weight of from about 5,000 to about 1,000,000 as calculated by GPC method.

2. An EPDM graft terpolymer, according to claim 1 wherein the number average molecular weight when said head group is ethylidenenorbornene is from about 50,000 to about 1,000,000.

3. An EPDM graft terpolymer, according to claim 1, wherein the number average molecular weight when said head group is said dicyclopentadiene is from about 10,000 to about 100,000 and wherein said molecular weight when said head group is said ethylidenenorbornene is from about 75,000 to about 150,000.

4. An EPDM graft terpolymer, according to claim 3, wherein the total number of ethylene and propylene units is from about 100 to about 3,000.

5. A process for making a graft terpolymer comprising the steps of:
reacting monomers of ethylene and propylene with a macromonomer in the presence of a Ziegler-Natta catalyst combination,
said ethylene and propylene monomers forming the backbone of the terpolymer and said macromonomer is a polymer attached to dicyclopentadiene or ethylidenenorborene, said dicyclopentadiene or ethylidenenorborene forming a portion of said backbone of said terpolymer and said polymer forming a pendant branch from said backbone.

6. A process according to claim 5, including carrying out said reaction in a temperature of from about 0° C. to about 50° C.

7. A process according to claim 6, wherein said macromonomer is a polymer attached to dicyclopentadiene or said ethylidenenorbornene, said dicyclopentadiene or said ethylidenenorbornene forming a portion of said backbone of said terpolymer and said polymer forming a pendant branch from said backbone.

8. A process according to claim 5, wherein said polymer is selected from the group consisting of polyisobutylene and polystyrene.

9. A process according to claim 8, wherein the amount of said ethylene and propylene units in said backbone ranges from about 100 to about 10,000.

10. A process according to claim 9, wherein the molecular weight of said terpolymer is from about 5,000 to about 1,000,000 when said macromonomer contains dicyclopentadiene and from about 50,000 to about 1,000,000 when said macromonomer contains ethylidenenorbornene, the molecular weight being calculated by GPC method.

11. A process according to claim 10, wherein said Ziegler-Natta catalyst is selected from the group of organoaluminum compounds in combination with a vanadium compound, and wherein the amount of said catalyst is from about 0.03 to about 3 moles per mole of said macromonomer, and wherein said temperature is from about 15° C. to about 25° C.

12. A process according to claim 11, wherein the number of pendant grafts ranges from about 1 to about 100.

13. A process according to claim 12, wherein the total amount of said ethylene units and said propylene units ranges from about 100 to about 3,000 and wherein the molecular weight of said terpolymer when said macromonomer contains dicyclopentadiene ranges from about 10,000 to about 100,000 and wherein the molecular weight of said terpolymer when said macromonomer contains ethylidenenorbornene ranges from about 75,000 to about 150,000, and wherein the amount of said catalysts is from about 0.1 to about 0.6 moles per mole of said macromonomer.

14. A process according to claim 13, wherein said catalyst is a mixture of $VOCl_3$ and $(C_2H_5)_3Al_2Cl_3$ and wherein the amount of said aluminum containing catalysts ranges from about 3 moles to about 5 moles per mole of vanadium containing catalyst.

15. The process of claim 5 wherein the polymer of the macromonomer is a polyisobutylene.

* * * * *